United States Patent [19]
DeGroff et al.

[11] Patent Number: 4,473,173
[45] Date of Patent: Sep. 25, 1984

[54] APPARATUS AND METHOD FOR LOW VOLUME DISPENSING

[75] Inventors: James T. DeGroff, Oldwick, N.J.; Stephen B. Maguire, Glen Mills, Pa.

[73] Assignee: Applied Color Systems, Inc., Princeton, N.J.

[21] Appl. No.: 456,643

[22] Filed: Jan. 10, 1983

[51] Int. Cl.³ .............................................. B67D 5/377
[52] U.S. Cl. ........................................ 222/63; 222/318
[58] Field of Search ................ 222/136, 214, 63, 318, 222/1; 417/412, 475, 476, 477

[56] References Cited

U.S. PATENT DOCUMENTS

| 315,667 | 4/1885 | Serdinko . | |
|---|---|---|---|
| 2,913,992 | 11/1959 | Blue et al. . | |
| 3,172,367 | 3/1965 | Kling . | |
| 3,340,817 | 9/1967 | Kemnitz . | |
| 3,403,631 | 10/1968 | Tangeman . | |
| 3,502,034 | 3/1970 | Pickup . | |
| 3,723,030 | 3/1973 | Gelfand . | |
| 3,737,251 | 6/1973 | Berman et al. . | |
| 3,739,717 | 6/1973 | Brown et al. . | |
| 3,791,777 | 2/1974 | Papoff et al. . | |
| 3,832,096 | 8/1974 | Gelfand . | |
| 4,217,993 | 8/1980 | Jess et al. | 222/63 X |
| 4,289,459 | 9/1981 | Neeley et al. . | |
| 4,331,262 | 5/1982 | Snyder et al. | 222/63 X |

OTHER PUBLICATIONS

"Wiz" Smartpump Dispenser and Diluter (Article).

Primary Examiner—Stanley H. Tollberg
Attorney, Agent, or Firm—Sperry, Zoda & Kane

[57] ABSTRACT

The apparatus includes a plurality of colorant reservoirs passing colorants and other ingredients through feed lines to a peristaltic pump which pumps the colorants into the input of three-way valves which are each movable between a dispensing mode and a recirculating made. In the recirculating mode the colorants pumped by the peristaltic pump will travel through the three-way valves and through return lines to the reservoirs from which the material originally emanated. If the three-way valve is in the dispensing mode the colorant will be discharged into a sample container for receiving the colorant mix. The peristaltic pump is driven by a drive motor such as a variable drive DC motor. The system is controlled by a system controller which receives input from a device such as a microprocessor which evaluates the required volume or weight of each particular colorant necessary to make a specific colorant mix. In order to carefully dispense such low volume of fluids the output curve of the peristaltic pump is divided into known segments and evaluated by the microprocessor input device and a segment of the output curve is utilized which positively displaces a known volume and is very repeatable. A position sensing device located adjacent to the pump emits a signal to the control whenever one of the rollers passes thereby. A counting device is positioned adjacent to the drive shaft of the drive motor and emits counts during rotation of the shaft.

20 Claims, 4 Drawing Figures

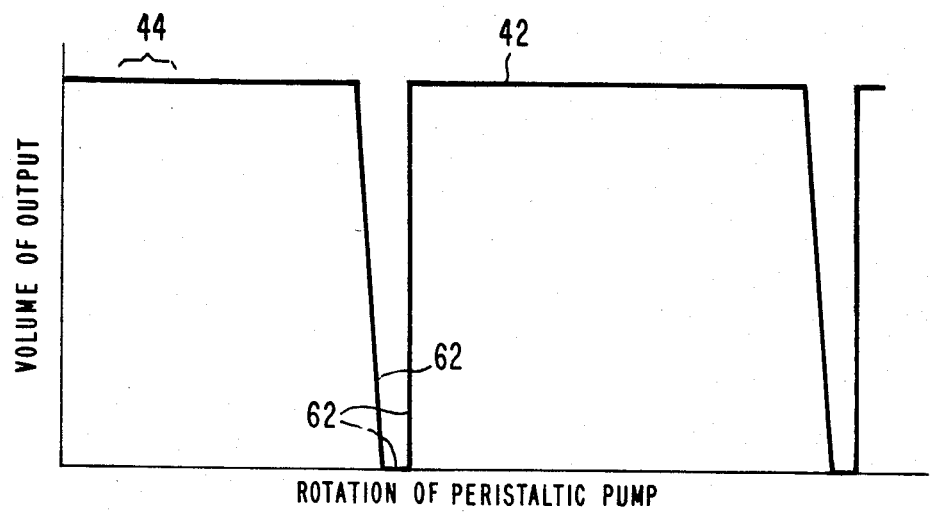
Fig. 2
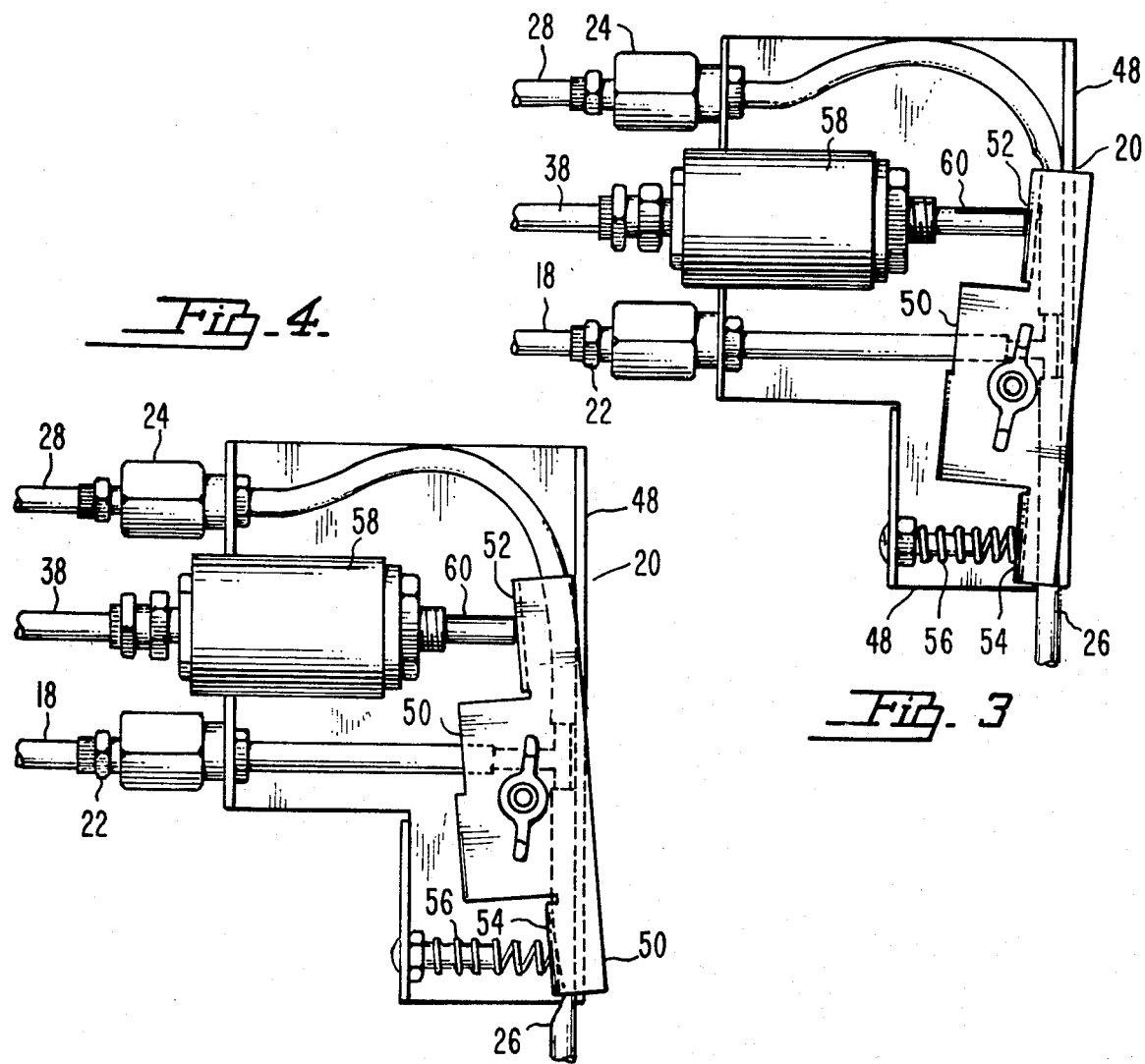
Fig. 3
Fig. 4

APPARATUS AND METHOD FOR LOW VOLUME DISPENSING

BACKGROUND OF THE INVENTION

1. Field Of The Invention

The present invention deals with the field of measuring very low volumes of fluid colorants and other ingredients dispensed to accurately achieve a desired fluid colorant mix. When matching colorants to previous samples or to a specifically desired coloration it is necessary to obtain extremely accurate measurement. Often a desired colorant mix requires a very small volume of a particular colorant of the formula to achieve the final desired colorant mix. Measuring of such low volumes is made more difficult due to the nature of many colorants which can be thixotropic making them difficult to dispense or may tend to clog or cavitate within dispensing conduits. Furthermore, different colorants and other fluid ingredients by their very nature tend to have significantly different material viscosities and therefore one system is desired which can handle materials of such a wide range of characteristics. Particularly, many colorants are normally in fluid carriers with compatable resins (and solvents), which when exposed to air will dry and may clog dispensing valves.

2. Description Of The Prior Art

Many prior art designs have been patented including U.S. Pat. No. 315,667 to J. Serdinko on a Rotary Force Pump; U.S. Pat. No. 2,913,992 issued to J. Blue on a Hose Pump; U.S. Pat. No. 3,172,367 to N. Kling on a Roller Type Pump; U.S. Pat. No. 3,340,817 to G. Kemnitz on a Pump; U.S. Pat. No. 3,403,631 to L. Tangeman on a Flow Metering And Dividing Device; 3,502,034 to R. Pickup on Roller Pump Heads; U.S. Pat. No. 3,723,030 to D. Gelfand on a Peristaltic Pump With Stacked Components; U.S. Pat. No. 3,373,251 to R. Berman et al on a Peristaltic Pump; U.S. Pat. No. 3,739,717 to C. Brown et al on a Wire Printing Apparatus Having Closed Inking System; U.S. Pat. No. 3,791,777 to P. Papoff et al on a Peristaltic Pump With A Plurality Of Continuously Adjustable Channels; U.S. Pat. No. 3,832,096 to D. Gelfand on a Multitube Peristaltic Pump With Individual Programming Control and U.S. Pat. No. 4,289,459 to W. Neeley et al on a Proportioning Pump.

None of these patents achieve the accuracy in measurement of low volumes of colorant and other fluid ingredients achievable with the present system. This is made possible by the careful pre-determined analysis of the output curve of the specific peristaltic pump means being used with the given system.

SUMMARY OF THE INVENTION

The present invention provides a low volume dispensing apparatus which has been shown to be specifically usable for the dispensing of colorants which are thixotropic as well as for the dispensing of colorants having wide ranges of material viscosities or drying characteristics. The low volume dispensing system includes a plurality of colorant reservoirs for holding each of the plurality of fluid colorants themselves. Also a plurality of feed line means each connecting one of the colorant reservoirs is positioned in fluid flow communication with respect to the associated colorant reservoir. A peristaltic pump means is connected at the input side in fluid flow communication with respect to the feed line means and therefore in fluid flow communication with respect to the colorant reservoir means to receive fluid colorants therefrom for pumping out through a plurality of pump line means connected to the output thereof.

The pump lines supply colorant under pressure to a three-way valve means. In particular the pump lines are connected to the inlet port of each three-way valve.

The three-way valve in construction includes a return outlet means and a dispensing outlet means. The three-way valve is actually movable between a dispensing mode wherein all the fluid colorant passes directly from the inlet port means to the dispensing outlet means and a recirculating mode wherein all of the fluid colorant passes directly from the inlet port means to the return outlet. In the dispensing mode the colorant pumped by the peristaltic pump is utilized to formulate a specific mix of colorants and other ingredients by passing through the dispensing mode and being received by a sample container means. On the other hand when the three-way valves are in the recirculating mode all of the fluid pumped by the peristaltic pump passes through the return outlet and is thereby returned directly to the specifically associated colorant reservoir.

The drive means is secured with respect to the peristaltic pump means for control of pumping thereof. In particular the drive means may be a variable drive direct current motor or an air motor.

A system control means provides the logic which achieves the desired result of this system. The position sensing means determines the instantaneous orientation of the peristaltic pump means to determine at what point in the output curve thereof the pump is positioned or in other words to determine the position of the rollers. The system control means receives a signal from the counting means. A drive control selectively controls rotation and speed of rotation of the drive means and therefore of the peristaltic pump. Also the system control means includes a valve control means secured to each of the three-way valves to selectively control the positioning of the valve between the recirculating mode and the dispensing mode.

An input means such as a microprocessor is connected to the system control means. This input means evaluates the non-linear output curve of positive displacement of the peristaltic pump being used in the given system to determine which segments thereof will most accurately and conveniently dispense the desired amounts and mix of colorant. The non-linear output curve of the peristaltic pump being evaluated is the positive displacement output by volume with respect to drive shaft movement which can be controlled as direct output by volume or by weight. The microprocessor or input means informs the control means to move a specific valve to the dispensing position at the beginning of a given segment and to move it to the recirculating position at the end of a given segment.

The counting means generates a given number of counts each time the drive shaft of the drive means rotates or in other words each time the pump rotates. Thus the pump is divided into a number of segments which lasts from one count to the next subsequent count. The speed of generation of the counts will vary in accordance with the speed of rotation of the drive shaft. The position sensing means emits a signal whenever a roller of the peristaltic pump passes adjacent thereto which thereby communicates information as to the pump position to the system control means. Often it is desirable to initiate dispensing at the initial point where a roller of the pump is adjacent to the position sensing means. This will actually initiate dispensing during a segment which is located in the non-linear portion of the positive displacement output curve of the pump. This presents no problem since each segment has a known output which need only be repetitious and not necessarily linear to accomplish the purposes of the present invention.

The three-way valve means may include a valve housing with a rocker clamp means pivotally mounted therein. This rocker clamp includes a first clamping means adjacent to the return outlet and a second clamping means adjacent to the dispensing outlet. The first clamping means is positioned to close the return outlet and the second clamping means is responsive to open the dispensing outlet responsive to the three-way valve means being placed into the dispensing mode. On the other hand the second clamping means is adapted to close the dispensing outlet means and the first clamping means is adapted to open the return outlet means responsive to the three-way valve means being moved to the recirculating mode.

The steady state position of the three-way valve means is the recirculating mode which is caused by a biasing means being fixedly secured with respect to the valve housing and placed in abutment with respect to the rocker clamp means to maintain the rocker clamp means in this recirculating or steady state mode. Preferably the control means is capable of moving the valve means from the recirculating mode to the dispensing mode by actuation of a solenoid means which urges the piston outwardly to abut the rocker clamp means to compress the biasing means and thereby urge the rocker clamp means to the dispensing mode.

It is an object of the present invention to provide a low volume dispensing system particularly usable for the dispensing of colorants which are thixotropic.

It is an object of the present invention to provide a low volume dispensing process particularly usable for the dispensing of a plurality of colorants having a wide range of material viscosities and drying characteristics.

It is an object of the present invention to provide a low volume dispensing process utilizing a peristaltic pump for accurate repetitive formation of colorants and other fluid ingredients mixtures.

It is an object of the present invention to provide a low volume dispensing system utilizing a peristaltic pump pumping a plurality of conduits containing mixtures of colorants and other fluid ingredients.

It is an object of the present invention to provide a low volume dispensing process which utilizes the known non-linear cyclical positive displacement output curve of a peristaltic pump means to determine those segments thereof which are specifically most accurately repeatable.

It is an object of the present invention to provide a low volume dispensing process including a control means which at all times instantaneously senses the positions of the rollers of the peristaltic pumping means.

It is an object of the present invention to provide a low volume dispensing system which includes a microprocessor for evaluating of the non-linear cyclical output curve of the peristaltic pump and to determine which segments thereof will dispense the desired portion of each colorant all being dispensed by the same peristaltic pump means.

It is an object of the present invention to provide a low volume dispensing system which can successfully handle a wide range of material viscosities dispensing small batches of sample quantities of materials such as paints, inks and other film forming products and dye solutions.

It is an object of the present invention to provide a low volume dispensing system which minimizes cavitation in pumping equipment.

It is an object of the present invention to provide a low volume dispensing system capable of delivering amounts as small as 1/10 of a milliliter of a number of materials for a given sample formulation.

It is an object of the present invention to provide a low volume dispensing system which breaks down the output curve of a peristaltic pump into predictable repeatable segments such that a microprocessor can choose which portion thereof to utilize for actual dispensing.

It is an object of the present invention to provide a low volume dispensing system which utilizes a peristaltic pump and the positive shutoff system of the three-way valve means responsive to the system controlling logic.

It is an object of the present invention to provide a low volume dispensing system which overcomes the difficulties of delivering fluid materials having widely varied flow and drying characteristics in minute quantities on a dependable basis.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 2 is a graph of a sample output curve of a peristaltic pump showing volume of output as the vertical variable and the rotational movement of the pump as the horizontal variable;

FIG. 3 is a side plan view of an embodiment of a three-way valve of the present invention shown in the dispensing mode; and FIG. 4 is an illustration of the valve shown in FIG. 3 positioned in the recirculating mode.

DETAILED DESCRIPTION OF THE PREFERRED EMBODIMENT

Figure 1:
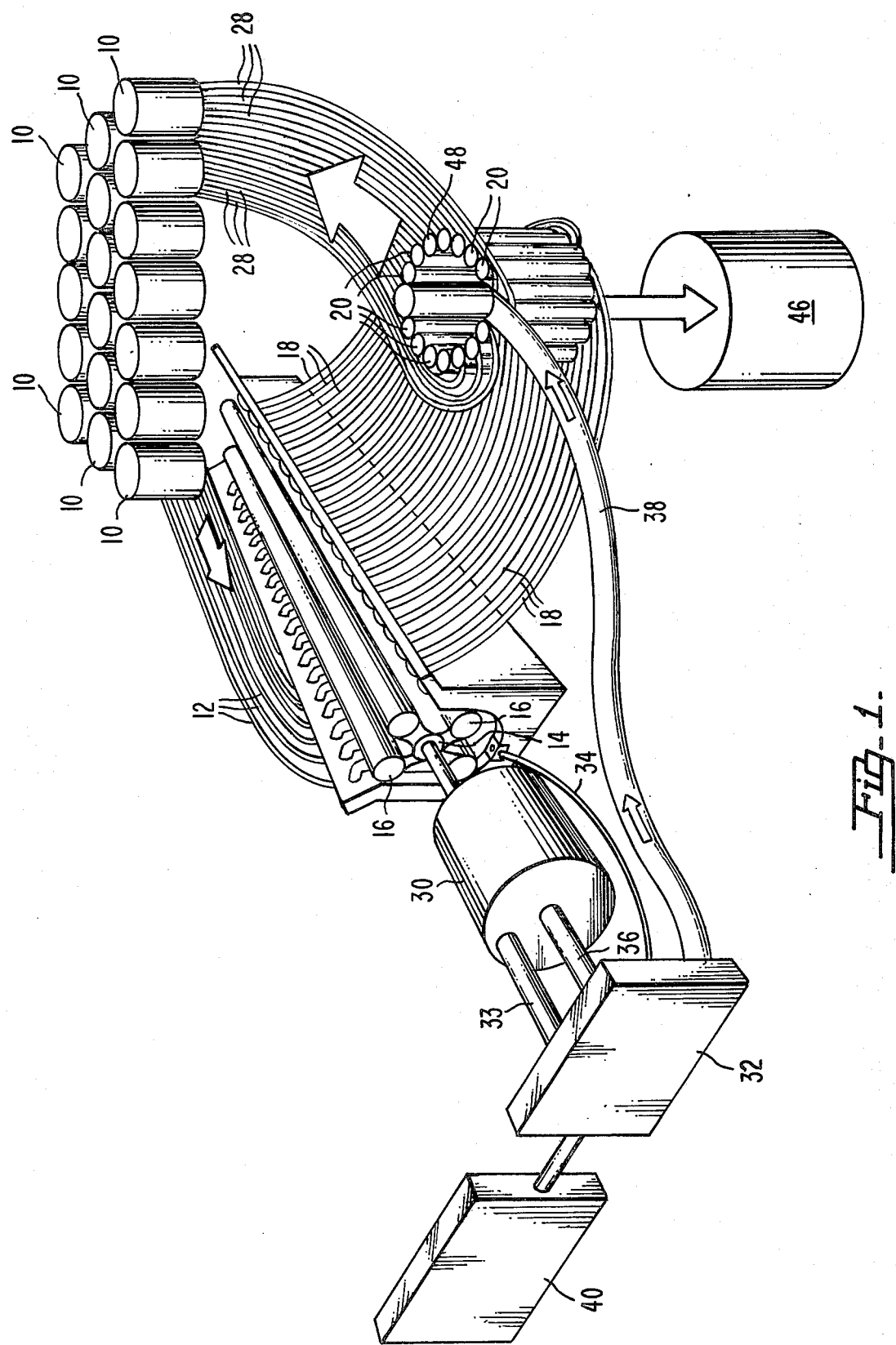
FIG. 1 is a schematic representation of the apparatus and process of an embodiment of the low volume dispensing system of the present invention.

A low volume dispensing apparatus is disclosed which is usable for repetitive and highly accurate dispensing. Such a system is particularly usable for colorants which tend to be thixotropic and form surface skins quite quickly upon exposure to the proper conditions. Also such a low volume dispensing apparatus is particularly desirable for use with a variety of colorants and other fluid ingredients which tend to have a wide range of specific material viscosities.

The present system includes a reservoir means 10 for holding colorants and possibly also other fluid ingredients of the colorant mix which may take the form of a plurality of containers for colorant each being in fluid flow communication with a feed line means 12 for carrying the specific colorant to a peristaltic pumping means 14. This pumping means includes a plurality of rollers 16 and as shown in FIG. 1 would include specifically four such rollers.

The peristaltic pump means 14 is adapted to pump the colorant received from feed lines 12 through pump lines 18 which are connected in fluid flow commuication to the output of pump 14. Pump line means 18 carries the colorant under pressure to a three-way valve means 20 and specifically to the inlet port 22 thereof.

Each three-way valve means includes a return outlet means 24 and a dispensing outlet means 26. The three-way valve itself is movable between the dispensing position and a recirculating position. In the dispensing position fluid flow communication from inlet port 22 is achieved directly through dispensing outlet means 26 and no flow through return outlet means 24 is possible. On the other hand when in the recirculating mode all colorant passing through inlet port 22 will pass through return outlet means 24 and be carried directly back to the associated colorant reservoir means 10. In this configuration the dispensing outlet means 26 will be closed. The return outlet means 24 carries the colorant to the colorant reservoir means 10 through return line means 28 in fluid flow communication therebetween.

Operation of the pump 14 is achievable by a drive means 30, which can be a direct current electrical motor, and which is operable to selectively cause powering of the pump at varying speeds. A system control means 32 is operable to control operation of drive means 30 as well as controlling operation of three-way valve means 20. In particular system control means 32 includes a position sensing means 34 for noting the actual position of the rollers 16 of peristaltic pump means 14 instantaneously at any given moment. Actually position sensing means 34 emits a signal whenever a roller passes adjacent thereto and this will provide the control means with the information as to the orientation of the rollers of the peristaltic pump means whenever such a roller passes by the means 34. Also a counting means 33 will be positioned adjacent to the drive means 30 and most particularly adjacent to the drive shaft thereof to emit a given number of counts throughout each single revolution thereof. This information is communicated to the system control means 32 and in cooperation with the information transmitted from the position sensing means 34 the control means 32 will have full information as to where in the positive displacement output curve the peristaltic pump is instantaneously located. This information can be then communicated from the control means 32 to an input means 40 such as a microprocessor for determining the proper moment for initiating movement of the desired valve to the dispensing mode. System control means 32 also includes a drive control means 36 for controlling whether the drive means 30 is operating or not and if it is operating for controlling the speed of operation thereof. System control means 32 also includes a valve control means 38 connected to each of the three-way valves 20 to determine whether these valves are in the recirculating mode or the dispensing mode.

An input means or microprocessor 40 provides the basic information to control means 32 such that a consistently repeatable low volume of colorant can be dispensed. In order to perform this function input means 40 has complete knowledge of the non-linear output curve of the specific peristaltic pump means 14 being utilized in the current system. This output curve 42 is the positive displacement of volume with respect to pump rotation as shown in FIG. 2 which could be converted to weight of output. Whenever a small volume of colorant is desired to be dispensed a particular segment 44 of this curve is chosen by the input means 40 which is desirable such as being relatively flat, easily reproducable or immediately or easily accessible. The microprocessor will then possibly reduce the speed of rotation of drive means 30 to a point where correct timing of movement of the three-way valve means to the desired mode is accurately achievable. Specifically when the position is reached within the cycle of rotation of the rollers 16 of the peristaltic pump means 14 of the initiation point of the chosen segment, the specific three-way valve means 20 will be moved to the dispensing mode. Colorant will thereby be dispensed during the term of the segment and at the termination point of the segment the system control means 32 will send a signal through valve control means 38 to cause the three-way valve means 30 to move to the recirculating position and thereby specifically and accurately achieve such low volume dispensing.

The primary end result of the process and apparatus of the present invention is to provide accurate dispensing repetitively. With a known number of counts being generated for each single rotation of the pump, the output thereof can be divided into an equal number of segments. The actual output during each segment can be a known quantity which can be available in a look-up table or by utilizing a mathematical formula which describes the positive displacement output curve of the pump. With the known output displacement of each segment it is not necessary that a flat or linear portion of the output curve be chosen for a given dispensing. At some time it is more advantageous to initiate dispensing at the moment a signal is generated by the position sensing means. Actually at this moment the output curve of the pump is in the valley portion 62. However as long as the output is known over the given segment or between counts generated by the counting means an accurate repetition is possible. Due to the convenience of initiating dispensing responsive to the emitting of a signal from the position sensing means often dispensing will actually be initiated during the lower portion 62 of the positive displacement output curve of the pump means.

A sample container means 46 will preferably be positioned adjacent to the dispensing outlet means 26 of each of the three-way valves 20 and thereby gather the desired sample mix.

Accuracy in dispensing is particularly achievable with the speciific three-way valve shown in FIGS. 3 and 4. This valving includes a valve housing 48 with a rocker clamp means 50 secured thereto to allow pivotal movement thereof. A first clamping means 52 is selectively positionable adjacent to the return outlet means 24. Also a second clamping means 54 is positioned adjacent to the dispensing outlet means 26. In the steady state position a biasing means such as a spring 56 will urge the second clamping means 54 into contact with the dispensing outlet means 26 which will cause closing thereof. This is the steady state for recirculating mode. All materials passing through the pump line means 18 into the three-way valve means 20 will be caused to pass outwardly through the return outlet means 24 and returned to the colorant reservoirs 10. A solenoid 58 preferably will be mounted within the valve housing means 48 and will include a piston means 60 operable upon actuation of the solenoid means 58 by the system control means 32 through valve control means 58 to abut the rocker clamp means 50 and cause the biasing means 56 to be compressed and move the three-way valve means 20 into the dispensing mode. In this dispensing mode the first clamping means 52 will close the return outlet means 24 simultaneously with the second clamping means 54 opening the dispensing outlet means 26 and allow the passage of material through the pump line means 18 and the inlet port 22 and out through the dispensing outlet means 26 to be received by the sample container means 46. This actuation of solenoid 58 will be achieved at the initial point of segment 44 along the output curve of the peristaltic pump means. Signals or counts are sent to the controller which represents the positive displacement of colorant by the pump within the desired segment. After the pre-determined number of counts have been given such that the output curve reaches the termination point of segment 54 the signal will be generated by the system control means 32 through the valve control means 38 to cause the solenoid means 58 to be actuated and withdrawing piston means 60 allowing the first clamping means to open the return outlet means 24 and allowing the second clamping means 54 to return to the steady state position of closing the dispensing outlet means 26. This is again the steady state recirculating position and the low volume and accurate dispensing has been achieved by limiting the dispensing to the predetermined segment of time 44.

The nature of a peristaltic pump allows for electrical pulses that are proportional to the positive displacement output as shown by the output curve in FIG. 2. An output valley 62 is achieved each time one of the rollers 16 passes over the output end of the peristaltic pump means. Normally it is desirable for the microprocessor to choose output segments which do not include any portion of the output valley 62. This is since the output varies so greatly over a very short given time period and output by volume or weight would not be so easily reproducable. However when larger volumes of output are desired it may be necessary to include more than one given cycle which in this case would be one quadrant of rotation of the peristaltic pump means and in this case an entire cycle is indeed an easily reproducable segment due to the fact that the entire portion of the output valley 62 is included. Whether the output valley 62 is included or not is a determination to be made by the system control means 32 or the microprocessor or input means 40 and in either case the chosen output would be easily reproducable. It is also possible to compensate for the difference in output by weighing the output relative to the position of the rollers. The weight will thereby determine total output rather than determining the total output merely by volume.

It should be appreciated that when the term colorant is used within the present invention it includes the entire colorant mix which may include various other fluid ingredients such as high temperature resistant additives, agents for aiding in flow, opacifying agents and the like.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A low volume dispensing process, particularly usable for for the dispensing of various colorants mixes which are thixotropic or which have a wide range of material viscosities and drying characteristics, said process comprising:
    (a) delivering a number of fluid colorants from individual colorant reservoirs through individual feed lines to a peristaltic pump means;
    (b) operating a peristaltic pump means selectively to draw fluid colorant from the feed lines and out through individual pump lines;
    (c) passing the fluid colorant through the individual pump lines to the inlet port of three-way valve means;
    (d) returning the fluid colorants from the return outlets of the three-way valve means to the individual colorant reservoirs through individual return lines responsive to the three-way valve means being in the recirculating mode;
    (e) dispensing of the fluid colorants from the dispensing outlets of the three-way valve means responsive to the three-way valve means being in the dispensing mode;
    (f) driving of the peristaltic pump means by a drive means;
    (g) emitting electrical signals during cyclical rotation of the drive means and the pump means;
    (h) determining the non-linear cyclical positive displacement output curve of the peristaltic pump means;
    (i) sensing the position of the rollers of the peristaltic pump means;
    (j) setting of the control means for desired amounts and mix of colorants;
    (k) evaluating the non-linear cyclical output curve to determine which segments thereof will dispense the desired amount and mix of colorants;
    (l) actuating of the valve means to the dispensing mode at the start of the desired segment for each desired colorant;
    (m) counting the emitted electrical signals after said actuating; and
    (n) moving of the valve means to the recirculating mode at the termination point of the desired segment after the predetermined number of counts have been emitted for each desired colorant.

2. The process as defined in claim 1 wherein said evaluating uses the non-linear curve of positive displacement output of volume of the peristaltic pump means with respect to pump rotation.

3. The process as defined in claim 1 wherein said evaluating uses the non-linear curve of the volume output calibrated to weight of the peristaltic pump means with respect to positive displacement movement of pump rollers against the fluid carrier tubes.

4. The process as defined in claim 1 wherein said setting of the control means for desired amounts and mixes of colorants is performed by a microprocessor.

5. The process as defined in claim 1 wherein said delivering of a number of fluid colorants is through multiple feed lines all passing through a single peristaltic pump.

6. The process as defined in claim 1 wherein said driving of the peristaltic pump means is variable in speed to allow accurate control of movement of the valve means from the recirculating mode to the dispensing mode.

7. The process as defined in claim 1 wherein said actuating and said moving of the valve means is achieved by urging movement of a rocker clamp pivotally from a steady state recirculating mode compressing the dispensing line and allowing fluid passage through the return line to an actuated dispensing mode compressing the return line and allowing passage through the dispensing line.

8. A low volume dispensing process, particularly usable for the dispensing of various colorant mixes which are thixotropic or which have a wide range of material viscosities or which have varying drying characteristics, said process comprising:
(a) delivering a number of fluid colorants from individual colorant reservoirs through individual feed lines to a single peristaltic pump means;
(b) operating a peristaltic pump means selectively to draw fluid colorant from the feed lines and out through individual pump lines;
(c) passing the fluid colorant through the individual pump lines to the inlet port of a three-way valve means;
(d) returning the fluid colorants from the return outlets of the three-way valve means to the individual colorant reservoirs through individual return lines responsive to the three-way valve means being in a recirculating mode;
(e) dispensing of the fluid colorants from the dispensing outlets of the three-way valve means responsive to the three-way valve means being in the dispensing mode;
(f) driving of the peristaltic pump means at selectively variable speeds by a drive means;
(g) emitting electrical signals during cyclical rotation of the drive means and the pump means;
(h) determining the non-linear cyclical output curve of volume positively displaced with respect to rotation of the peristaltic pump means;
(i) sensing the position of the rollers of the peristaltic pump means;
(j) setting of the control means by a microprocessor for desired amounts and mixes of colorants;
(k) evaluating the non-linear cyclical output curve of volume output over time to determine which segments thereof will most accurately dispense the desired amount and mix of colorants;
(l) actuating of the valve means to the dispensing mode at the start of the desired segment for each desired colorant by urging a rocker clamp to move pivotally to a position compressing the return line and allowing fluid colorant passage through a dispensing line;
(m) counting the emitted electrical signals after initiation of said actuating; and
(n) moving of the valve means to the recirculating mode at the termination point of the desired segment after the predetermined number of counts have been emitted for each desired colorant by urging a rocker clamp to move pivotally to a steady state position compressing the dispensing line and allowing fluid colorant passage through a return line.

9. A low volume dispensing apparatus, particularly usable for the dispensing of various colorant mixes which are thixotropic or which have a wide range of material viscosities, which comprises:
(a) colorant reservoir means for holding a plurality of fluid colorants and other fluid ingredients;
(b) feed line means in fluid flow communication with respect to said colorant reservoir means for delivering fluid colorants therefrom;
(c) peristaltic pump means in fluid flow communication with respect to said feed line means to receive fluid colorants therefrom for pumping;
(d) pump line means in fluid flow communication with respect to the output of said peristaltic pump means for receiving colorants pumped therefrom;
(e) three-way valve means defining an inlet port means in fluid flow communication with respect to said pump line means to receive colorant therefrom, said three-way valve means including a return outlet means and a dispensing outlet means, said three-way valve means being selectively movable between a dispensing mode, with all fluid colorant passing directly from said inlet port means to said dispensing outlet means, and a recirculating mode with all fluid colorant passing directly from said inlet port means to said return outlet means;
(f) return line means in fluid flow communication with respect to said return outlet means of said three-way valve means and with respect to said colorant reservoir means to return fluid colorant from said outlet means to said colorant reservoir means;
(g) drive means for selectively driving of said peristaltic pump means;
(h) system control means for controlling dispensing of colorant including:
(1) a position sensing means for determining instantaneous orientation of said peristaltic pump means;
(2) drive control means for selectively controlling operation of said drive means;
(3) valve control means for controlling movement of said three-way valve means between the recirculating mode and the dispensing mode;
(4) counting means positioned adjacent to said drive means and said pump means for emitting electrical signals responsive to rotation thereof; and
(i) input means to evaluate the non-linear positive displacement output curve of said peristaltic pump means and to determine which segments thereof will most accurately dispense the desired amount and mix of colorants, said input means being operatively connected to actuate said system control means for dispensing during the desired segments.

10. The apparatus as defined in claim 9 wherein said input means is a microprocessor.

11. The apparatus as defined in claim 9 further including a sample container means positioned adjacent to said dispensing outlet means of said three-way valve means to receive fluid colorants dispensed therefrom.

12. The apparatus as defined in claim 9 wherein said drive control means operably controls the speed of operation of said drive means.

13. The apparatus as defined in claim 9 wherein said drive means is a direct current motor.

14. The apparatus as defined in claim 9 wherein the non-linear positive displacement output curve of said peristaltic pump means is the output of colorant by volume with respect to pump rotation.

15. The apparatus as defined in claim 9 wherein the non-linear output curve of said peristaltic pump means is the output of colorant by weight with respect to the relationship of volumetric positive displacement to the actual weight of material dispensed.

16. The apparatus as defined in Claim 9 wherein said three-way valve means includes a valve housing and a rocker clamp means pivotally mounted thereto, said rocker clamp means including a first clamping means and a second clamping means, said first clamping means positioned to close said return outlet means and said second clamping means responsive to open said dispensing outlet means responsive to said three-way valve means being in the dispensing mode, said second clamping means positioned to close said dispensing outlet means and said first clamping means responsive to open said return outlet means responsive to said three-way valve means being in the recirculating mode.

17. The apparatus as defined in claim 16 further including a biasing means fixedly secured to said valve housing and in abutment with respect to said rocker clamp means to maintain said rocker clamp means in the recirculating mode.

18. The apparatus as defined in claim 17 further including a solenoid means operable upon actuation to abut said rocker clamp means to compress said biasing means and urge said rocker clamp means to the dispensing mode.

19. The apparatus as defined in claim 9 wherein said control means is operable to maintain said three-way valve means in the dispensing mode until a predetermined number of electrical signals are emitted by said counting means.

20. A low volume dispensing apparatus, particularly usable for the dispensing of various colorant mixes which are thixotropic or which have a wide range of material viscosities, which comprises:
 (a) colorant reservoir means for holding a plurality of fluid colorants and other fluid ingredients;
 (b) feed line means in fluid flow communication with respect to said colorant reservoir means for delivering fluid colorants therefrom;
 (c) peristaltic pump means in fluid flow communication with respect to said feed line means to receive fluid colorants therefrom for pumping;
 (d) pump line means in fluid flow communication with respect to the output of said peristaltic pump means for receiving colorants pumped therefrom;
 (e) three-way valve means defining an inlet port means in fluid flow communication with respect to said pump line means to receive colorant therefrom, said three-way valve means including a return outlet means and a dispensing outlet means, said three-way valve means being selectively movable between a dispensing mode, with all fluid colorant passing directly from said inlet port means to said dispensing outlet means, and a recirculating mode with all fluid colorant passing directly from said inlet port means to said return outlet means, said three-way valve means including a valve housing and a rocker clamp means pivotally mounted thereto, said rocker clamp means including a first clamping means and a second clamping means, said first clamping means positioned to close said return outlet means and said second clamping means responsive to open said dispensing outlet means responsive to said three-way valve means being in the dispensing mode, said second clamping means positioned to close said dispensing outlet means and said first clamping means responsive to open said return outlet means responsive to said three-way valve means being in the recirculating mode, said three-way valve means further including a biasing means fixedly secured with respect to said valve housing and in abutment with respect to said rocker clamp means to maintain said rocker clamp means in the recirculating mode in the steady state condition, said three-way valve means further including a solenoid means operable upon actuation to abut said rocker clamp means to compress said biasing means and urge said rocker clamp means to the dispensing mode;
 (f) return line means in fluid flow communication with respect to said return outlet means of said three-way valve means and with respect to said colorant reservoir means to return fluid colorant from said outlet means to said colorant reservoir means;
 (g) direct current variable drive means for selectively driving of said peristaltic pump means;
 (h) system control means for controlling dispensing of colorant including:
  (1) a position sensing means for determining instantaneous orientation of said peristaltic pump means;
  (2) drive control means for selectively controlling operation of said drive means; and
  (3) valve control means for controlling movement of said three-way valve means between the recirculating mode and the dispensing mode;
  (4) counting means positioned adjacent to said drive means and said pump means for emitting electrical signals responsive to rotation thereof;
 (i) microprocessor means to evaluate the non-linear positive displacement volume output curve of said peristaltic pump means and to determine which segments thereof will most accurately dispense the desired amount and mix of colorants, said microprocessor means being operatively connected to actuate said system control means for dispensing during the desired segments; and
 (j) a sample container means positioned adjacent to said dispensing outlet means of said three-way valve means to receive fluid colorants dispensed therefrom.

* * * * *